United States Patent [19]

Engstrom

[11] Patent Number: 5,105,910

[45] Date of Patent: Apr. 21, 1992

[54] PORTABLE TREE STAND ASSEMBLY FOR HUNTERS

[76] Inventor: Jay C. Engstrom, 22487 County Rd. 73, Big Lake, Minn. 55309

[21] Appl. No.: 637,681

[22] Filed: Jan. 7, 1991

[51] Int. Cl.⁵ .............................................. A01M 31/00
[52] U.S. Cl. .................................. 182/187; 182/152; 224/155
[58] Field of Search ............... 182/187, 188, 133, 134, 182/152; 108/152; 224/155

[56] References Cited

U.S. PATENT DOCUMENTS

| | | | |
|---|---|---|---|
| D. 270,474 | 9/1983 | Haines et al. | 182/187 X |
| D. 306,348 | 2/1990 | Baumeister | D25/62 |
| 2,375,685 | 5/1945 | Pennington | 182/187 |
| 4,009,763 | 3/1977 | Hunter | 182/187 |
| 4,124,094 | 11/1978 | Cande | 182/187 |
| 4,129,198 | 12/1978 | Hunter | 108/152 X |
| 4,236,602 | 12/1980 | Leggett | 182/187 |
| 4,549,635 | 10/1985 | Early | 108/152 X |
| 4,721,183 | 1/1988 | Koniecka | 108/152 X |
| 4,730,699 | 3/1988 | Threlkeld | 182/187 |
| 4,782,918 | 11/1988 | Brunner et al. | 182/187 |
| 4,784,239 | 11/1988 | Kirkman | 182/187 |
| 4,987,972 | 1/1991 | Helms | 182/134 X |

Primary Examiner—Karen J. Chotkowski
Attorney, Agent, or Firm—Kinney & Lange

[57] ABSTRACT

A tree stand assembly includes a horizontal platform and floor to be supported on a tree trunk by a pair of vertical stabilizing bars and a pair of compression struts running from a front edge portion of the platform to a lower end of each of the stabilizing bars. To fasten this platform to a tree trunk, a link chain is fastened at the top of one of the vertical bars and extends around the tree to the other vertical bar where a pivotally mounted latch hook extends through an appropriate link on the chain. The latch hook is rotated away from the tree trunk by a latch lever to tension the chain and hold the platform in place. A latch plate keeps the latch hook in place. A seat assembly is then mounted on the platform. Shoulder straps are provided on the platform, and the seat assembly can be placed in parallel relationship with respect to the platform floor, and the entire tree stand assembly can be carried as a back pack.

10 Claims, 4 Drawing Sheets

PORTABLE TREE STAND ASSEMBLY FOR HUNTERS

BACKGROUND OF THE INVENTION

This invention has relation to a tree stand of the kind that is packed into the woods, attached to a tree, and on which a hunter can stand while awaiting game such as deer to approach.

It is known to provide a tree stand assembly wherein a horizontal platform is supported on the tree trunk by a pair of vertical, trunk contacting, stabilizing bars which extend integrally downwardly from a back end portion of the platform. Such a platform can be held against a tree trunk by hooking one link of a chain to one side of the back portion of the platform and another link of the same chain to the other side of the platform. Such a platform can be kept from slipping down the tree by providing huge spikes at the bottom of the vertical bars and driving those spikes into the tree trunk. See U.S. Design Pat. No. 306,348 granted to Baumeister on Feb. 27, 1990.

A deficiency of such prior art devices has been the necessity of pounding large spikes and the like into the tree trunk to the detriment of the tree. Other stands and steps have been developed which rely on actually screwing the stand into the tree at the top edge of the platform and then either screwing the bottom ends of the bars into the tree or pounding spikes on the bottom ends of the bars into the tree.

Such prior art devices are often made of iron or steel and are, consequently, heavy to carry into the woods and are even more difficult to carry out of the woods if the hunter is successful and has to also transport a deer or other large game animal out at the same time.

It is known to provide portable deer stands which are built up on the spot by assembling metallic bars. These are inconvenient and, perhaps worse, the inevitability or possibility of the clash of metal on metal can do much to deter game animals from frequenting their regular trails along which the hunter is deploying a tree stand or other deer stand.

The provision for a seat assembly on a deer stand is a highly desirable accomplishment. A seat makes it possible for the hunter to spend many more hours in position without having to climb down to exercise, for example. It is much easier, of course, to assemble the deer stand to the tree trunk, and then to put the seat assembly into place. Before the present invention, this could mean the necessity for carrying two separate units (the tree stand assembly including the platform itself and the seat assembly), both into and out of the woods.

What was needed before the present invention was a tree stand assembly including a seat assembly, which could easily be carried into the woods and out of the woods again as a back pack.

SUMMARY OF THE INVENTION

In a tree stand assembly wherein a horizontal platform is supported on a tree trunk by a pair of vertical stabilizing bars which extend downward from a back end portion of the platform and by a holding line extending from fixed relation with respect to a first upper edge of the platform back end portion, around the tree trunk and into fixed relation with respect to a second upper edge portion of the platform back end portion. Over what existed in the prior art, the following improvements have been developed.

The platform of the present invention includes a rigid, horizontal frame which partially defines the outer periphery of the platform. The frame is of elongate, generally U-shape configuration and is of continuous beam construction terminating in first and second spaced-apart frame beam ends. The platform also includes a floor connected to and supported by the frame.

Vertical stabilizing bars are integrally, rigidly and permanently connected to the frame, one at each of the frame beam ends.

The holding line is constituted as a link chain permanently anchored at its first and in fixed relation to the platform frame adjacent the first frame beam end, the chain having a second free portion adapted to be temporarily anchored in fixed relation to the frame adjacent to the second frame beam end.

Means is provided to temporarily fixedly anchor the second free portion of the chain to the second beam end under sufficient tension to hold the tree stand in place when under human load without further penetration into the tree trunk.

DETAILED DESCRIPTION OF THE PREFERRED EMBODIMENTS

Figure 2:
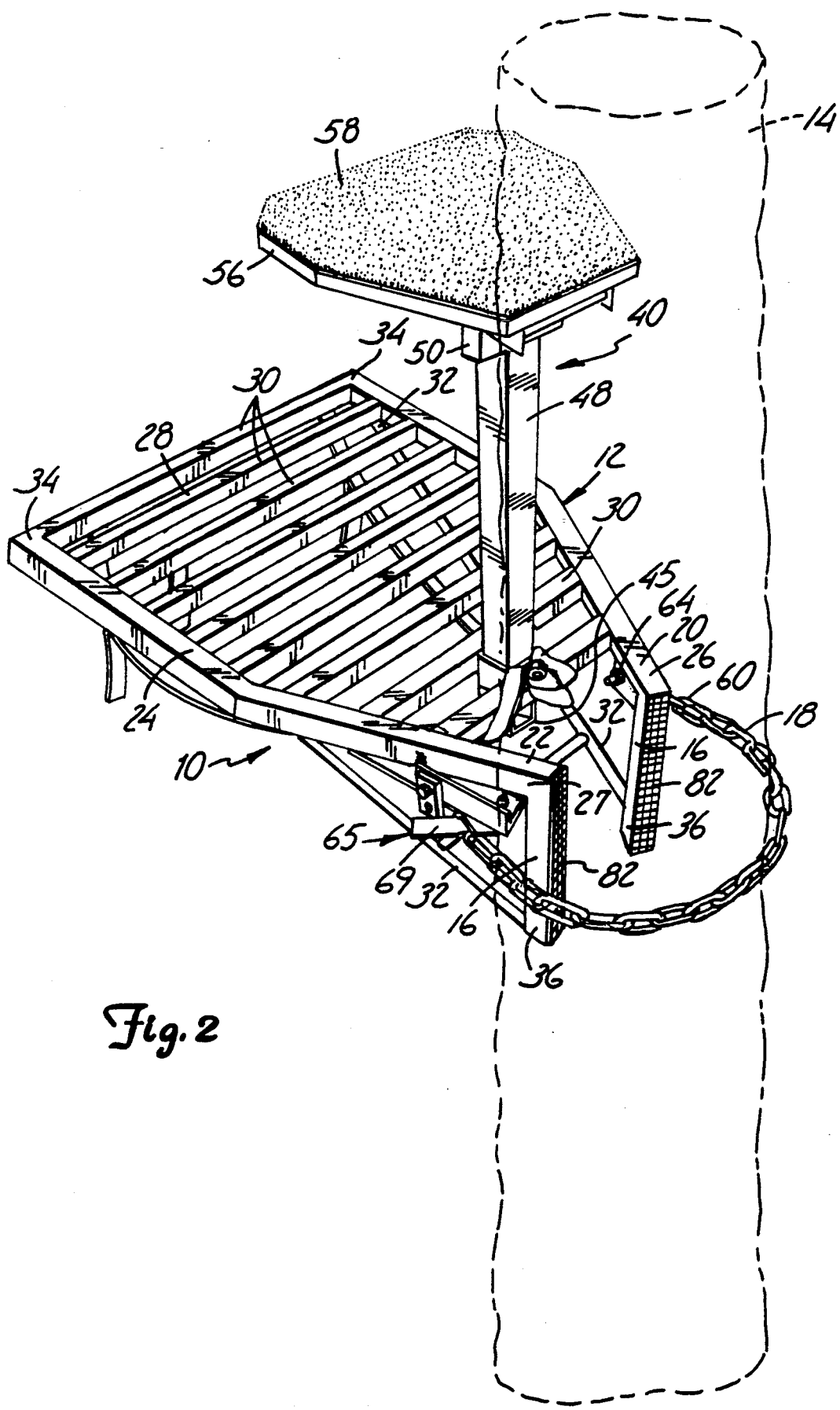
FIG. 2 is a perspective view of the tree stand of FIG. 1 shown in position for use on the trunk of a tree, the position of the tree trunk being indicated in dotted lines.

A tree stand assembly 10 includes a platform 12 to be supported horizontally on a tree trunk 14, indicated in dotted lines in FIG. 2, by two tree trunk contacting stabilizing bars 16,16 positioned vertically against the tree trunk.

A holding line, here constituted as a link chain 18, extends from fixed position with respect to a first upper back edge 20 of the platform and around the tree trunk 14 where it is temporarily fastened under great tension with respect to a second upper back edge 22 of the platform.

Platform 12 includes a rigid, horizontal frame 24 forming the outer periphery of the platform. Frame 24 is very roughly of generally U-shaped configuration and is of continuous beam construction terminating in a first beam end 26 and a second beam end 27 spaced from the first beam end 26. This configuration and construction is probably best seen in FIG. 1. Each tree trunk stabilizing bar 16 extends integrally rigidly and permanently down from one of the beam ends 26 and 27, at right angles thereto.

In the form of the invention as shown, a platform floor 28 is made up of a plurality of mutually parallel cross beams 30 welded to inside edges of the frame 24. In certain situations, this ability to "see through" the floor is advantageous to a hunter. In other situations, the floor could be made solid, or expanded metal, for example, could be fastened over the cross beams 30.

To support the front end of the platform 12, pair of spaced-apart compression struts 32,32 extend from under front edges 34,34 of the platform 12 to lower ends 36,36 of the stabilizing bars 16,16. The struts can be permanently welded in place.

Figure 1:
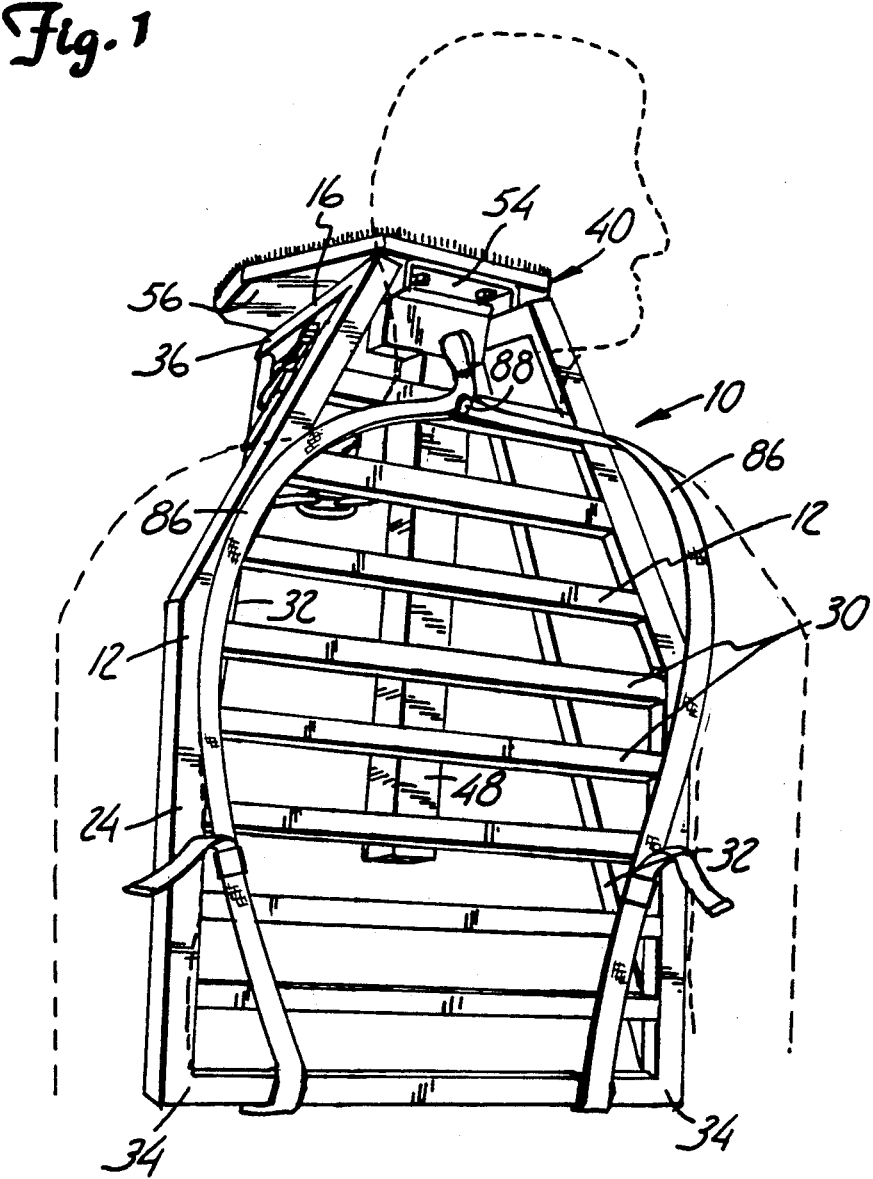
FIG. 1 is a perspective view of a tree stand assembly of the present invention shown in position and in condition for being packed to a hunting area on the back of a hunter with the position of the hunter indicated in dotted lines.
Figure 3:
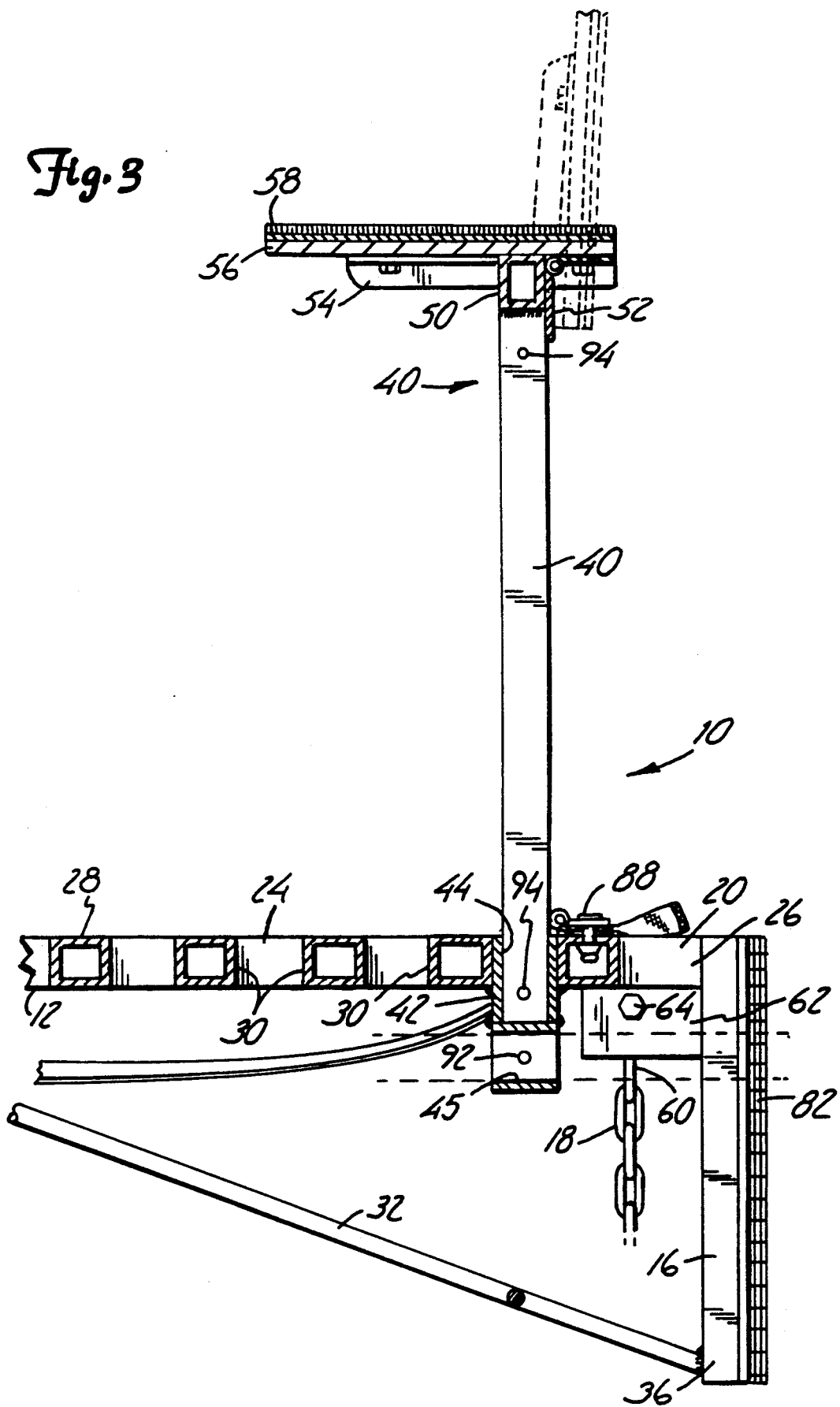
FIG. 3 is a transverse vertical sectional view of the tree stand positioned as in FIG. 2 as it would look as assembled on the ground before attaching it to a tree.

The tree stand assembly 10, as shown, includes an optional seat assembly 40. To accommodate this seat assembly either in the installed position for use in hunting as seen in FIGS. 2 and 3, or in its "packed away" condition as seen in FIG. 1 and as suggested in FIG. 4, a pocket tube 42 is welded into the floor of the platform 12. As best seen in FIG. 3, the pocket tube provides an upwardly open, closed bottom vertical pocket or socket 44, and a horizontally positioned open-ended sleeve or pocket 45.

The seat assembly 40, itself, includes a seat stanchion 48 rectangular in transverse cross section and of dimension to fit easily and snugly into either the vertical socket 44 or the horizontal sleeve 45. The seat assembly also includes a short seat support beam 50 welded to the top of the seat stanchion to extend in parallel relation to the floor of the platform. One butt of a seat support hinge 52 is welded to the seat support beam 50, and the other butt of that hinge is bolted to a U-shape bracket 54 to which a wooden seat 56 is also bolted. As shown, a cushioning material 58 is affixed to the upper surface of the seat 56. This material 58 is more comfortable to sit upon, but it is perhaps more important because it reduces the tendency of the hunter to slide on the seat.

As seen in FIG. 3, with a bottom end of the seat stanchion 48 situated in the vertical socket 44, the seat 56 can be moved from position for use as seen in full lines to a "clearance" position as seen in dotted lines. This affords more room for the hunter to move around on the platform. The positioning of the hinge and the seat are such that the seat leans to the rear when lifted to the "clearance" position so that it will not fall by gravity back into the hunter's way. When the hunter needs even more clearance, the entire seat assembly can simply be lifted clear of the pocket 44 and the platform and lowered to the ground.

As the platform is being fastened to a tree trunk, the seat assembly will, of course, usually remain on the ground. After the platform is so anchored, the seat assembly will be installed to the position as seen in FIG. 3.

To provide an anchor for a first end portion 60 of chain 18 with respect to first upper back edge 20 of the platform, a permanent chain anchor plate 62 is welded to the intersection between the first beam end 26 and its associated tree trunk stabilizing bar 16. First end portion 60 of chain 18 is bolted to that plate as at 64.

Means 65 to temporarily fixedly anchor the free portion of the chain 18 to the second beam end 27 after the chain has been extended from the first beam end 26 around the tree trunk 14 includes a latch anchor frame 66. As perhaps most clearly seen in FIG. 5, this frame is constituted as a portion of ar angle iron welded to the second beam end 27 adjacent to its vertical tree trunk stabilizing bar 16. A latch lever 68 and a latch hook 69 are welded to each other as most clearly seen in FIGS. 4 and 5, and this combination is pivotally mounted as at 70 with respect to the latch anchor frame 66 as seen in those figures.

Figure 4:
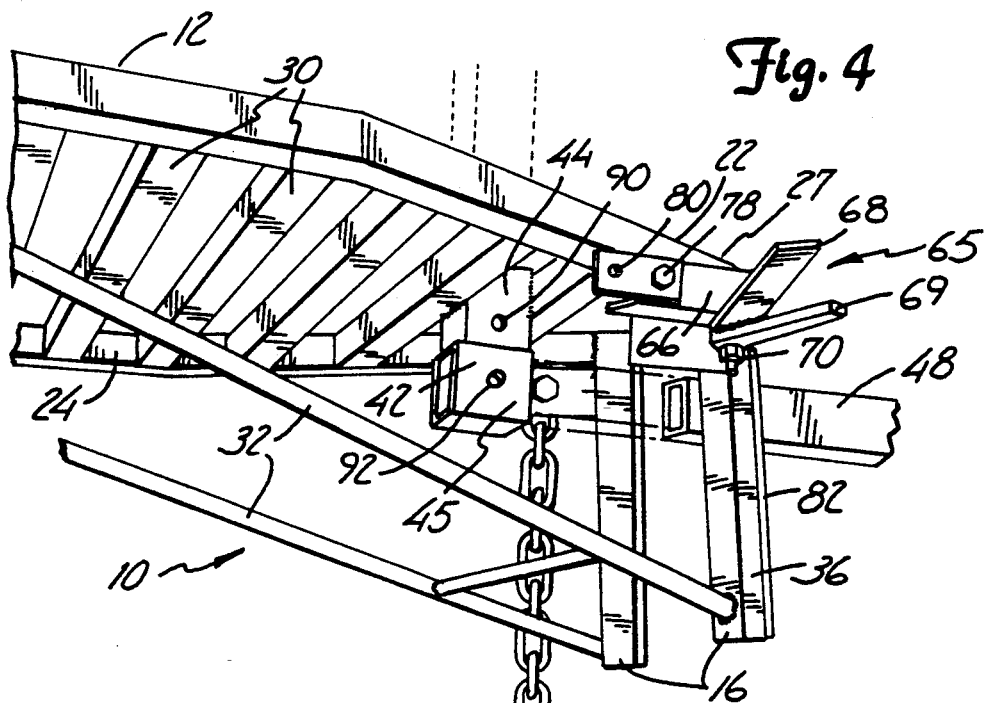
FIG. 4 is a perspective view of a fragment of the tree stand as seen from the left and below FIG. 3, but showing a seat stanchion removed from its upright position of FIG. 3 and aligned to move to its "packed away" position as seen in FIG. 1.
Figure 5:
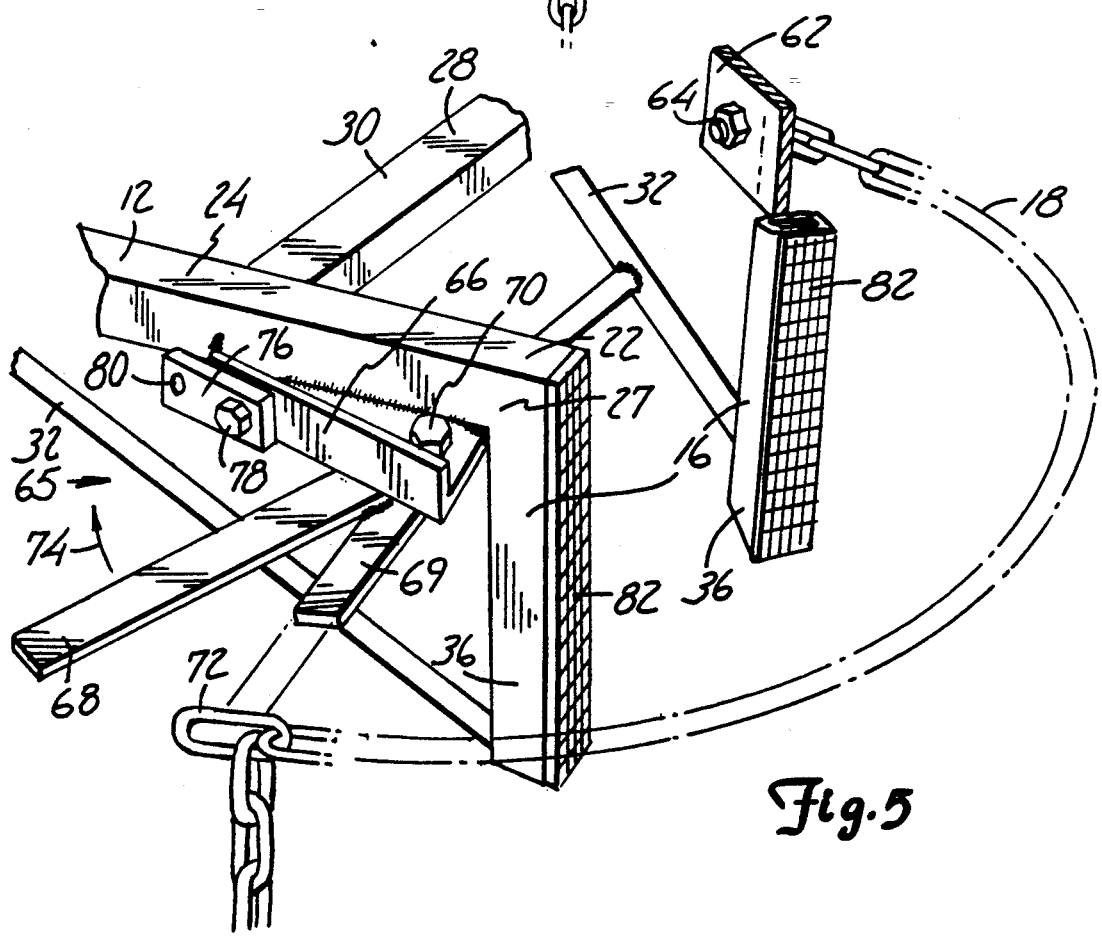
FIG. 5 is a further enlarged fragmentary view as seen from the right and above the tree stand assembly as pictured in FIG. 3.

With the latch lever and hook positioned as seen in FIGS. 4 and 5, and with the platform and stabilizing bars positioned on the tree trunk at a desired position, a chain link 72 which will snugly fit over the latch hook 69 will be so positioned. The latch lever 68 will be forced in the direction of the arrow 74 to draw the chain 18 up tight against the tree trunk. When the latch lever reaches a parallel relationship with respect to the upright leg of the angle iron latch anchor frame 66, a latch plate 76 (pivotally mounted to the upright leg of latch anchor frame 66 as at 78) will be rotated down from position as seen in FIGS. 4 an 5 to position as seen in FIG. 2, thus temporarily holding the chain 18 in a highly tensioned relationship with respect to the tree trunk 14 and the remainder of the tree stand assembly.

The latch plate 76 is provided with a lock receiving opening 80 therethrough. As will be understood from the positioning of the latch plate in FIG. 2, a padlock extending through opening 80 will prevent rotation of the latch plate into clearing relation with the latch lever 68, and, by so doing, will prevent accidental release of the tree stand assembly from the tree trunk 14. It will also present theft of the tree stand assembly from the tree trunk should the tree stand assembly be left in position over night, for example.

When it is desired to release the tree stand assembly from the tree trunk, the latch plate 76 will be rotated to clearing relationship with respect to the latch lever 68. As the latch lever moves in direction counter to the arrow 74, the latch hook 69 will release chain link 72, and the entire assembly will be free of the tree trunk.

Each of the tree trunk stabilizing bars 16 is covered with a relatively thick cushion, matting or padding 82. This matting serves several purposes. First, it will reduce the tendency of the stabilizing bars 16,16 to slide down the tree trunk before the full tensioning is applied to the link chain 18 Second, it will tend to compress to more evenly distribute the forces of the stabilizing bars against the uneven configurations of a tree trunk. Third, since tree trunks selected for supporting the tree stand assembly will have widely differing average diameters, the matting will tend to compress either or the inside vertical edges (for relatively small trees) or on the outside vertical edges (for relatively large trees) of the bars 16. This will provide a wider area of support between the stabilizing bars and the tree trunk than would be afforded if simple straight faced metallic bars were used. Fifth, and perhaps of even greater importance, the matting 82 will tend to protect the tree trunk from damage by stabilizing bars 16,16.

While the link chain 18 is shown to be uncovered, by positioning burlap or canvas or even lengths of rubber hose over the holding line, substantially all damage to the tree trunk by the line can be avoided.

The portability of the tree stand assembly 10 is best illustrated in FIG. 1. With the tree stand assembly disassembled as suggested in FIG. 4, and with seat stanchion 48 placed inside of sleeve or pocket 45 as suggested in that figure, it will be moved in until seat 56 rests against the tree trunk stabilizing bars 16,16. At that point, a pair of shoulder straps 86,86 (which are permanently mounted at first ends to one of the cross beams 30 as at 88) will be slung over the shoulders of a hunter. Second ends of the shoulder straps will be adjusted with respect to the front edges 34,34 of the platform 12. With these straps in position as seen in full lines in FIG. 1, the hunter (indicated by dotted lines in that figure) can easily carry the entire tree stand assembly into the woods or out of the woods.

As best seen in FIG. 4, openings 90 and 92 can be provided clear through the socket 44 and the sleeve pocket 45, respectively, As seen in FIG. 3, appropriate openings 94 can be provided in the seat stanchion so that pins (not shown) can be used to fasten the seat stanchion in either upright or "packing out" position should that be considered necessary or desirable.

Although the present invention has been described with reference to preferred embodiments, workers skilled in the art will recognize that changes may be made in form and detail without departing from the spirit and scope of the invention.

What is claimed is:

1. In a tree stand assembly wherein a horizontal platform is supported on a tree trunk by a pair of vertical, trunk contacting, stabilizing bars which extend integrally downward from a back end portion of the platform and by a holding line extending from fixed relation with respect to a first upper edge of the platform back end portion and around the tree trunk into fixed relation with respect to a second upper edge of said platform back end portion, and wherein the platform is also supported by at least one compression strut extending from a front edge portion of the platform to a lower end of at least one of the stabilizing bars; the improvement wherein:
   (a) the platform includes a rigid, horizontal frame partially defining its outer periphery, and a floor connected to and supported by the frame, the frame being of elongate, generally U-shape configuration and of continuous beam construction terminating in first and second spaced apart frame beam ends;
   (b) the vertical stabilizing bars are integrally, rigidly and permanently connected to the frame, one at each of the frame beam ends;
   (c) the holding line is constituted as a link chain permanently anchored at a first end thereof in fixed relation to the frame adjacent to said first frame beam end, and having a second free portion adapted to be temporarily anchored in fixed relation to the frame adjacent said second frame beam end;
   (d) means is provided to temporarily fixedly anchor the second free portion of the chain to the second beam end under sufficient tension to hold the tree stand in place when under human load without further penetration into the tree trunk;
   (e) a vertical, upwardly open seat stanchion receiving socket is rigidly mounted with respect to said platform to be open through said platform floor;
   (f) the tree stand assembly also includes a removable seat assembly having an elongate seat stanchion and a seat mounted on an upper end of the stanchion, said seat stanchion having a lower end which fits snugly and removably into said socket to define an in-use position of the seat assembly wherein the seat stanchion is disposed substantially perpendicular to the platform; and
   (g) an open-end stanchion receiving sleeve is rigidly mounted with respect to the platform and oriented substantially perpendicular to said socket, said sleeve is configured to removably receive said stanchion to define a packed away position of the seat assembly wherein the seat stanchion is disposed substantially parallel to the platform between the stabilizing bars with the seat resting against said stabilizing bars.

2. The tree stand assembly of claim 1 wherein:
   (h) first ends of two shoulder straps are centrally mounted with respect to the back end portion of the platform and a second end of each strap is fastened with respect to one of opposite, spaced apart, front edges of the platform, the straps being so positioned and of length so that a hunter can carry the tree stand assembly as a back pack.

3. The tree stand assembly of claim 1 wherein:
   (n) first end portions of two shoulder straps are fixedly and centrally mounted with respect to a back end portion of the platform, the effective length of a second free end portion of each strap being adjustable with respect to one of opposite, spaced-apart, front edges of the platform, the straps being so positioned that when properly adjusted for length, a hunger can carry the tree stand assembly as a back pack.

4. The tree stand assembly of claim 1 wherein:
   (h) a latch frame extends integrally from the platform frame in adjacent relation to the second frame beam end and its associated vertical stabilizing bar;
   (i) the means to fixedly anchor the free portion of the chain includes a latch hook pivotally mounted to the latch frame on a vertical axis, an outer end of the hook being of configuration to pass through a link of said chain and being movable between an open position in near relation to the adjacent vertical bar and a latched position spaced farther from the bar;
   (j) a latch lever integrally associated with said latch hook to pivot with said hook; and
   (k) a latch plate movable with respect to said platform frame between an unlatched position and a latched position, said latch plate being movable to its latched position when said latch hook is in its latched position to prevent movement of the hook from its latched position until the latch plate is moved to its unlatched position.

5. The tree stand assembly of claim 4 wherein:
   (l) first and portions of two shoulder straps are fixedly and centrally mounted with respect to a back end portion of the platform, the effective length of a second free end portion of each strap being adjustable with respect to one of opposite, spaced-apart front edges of the platform, the straps being so positioned that when properly adjusted for length, a hunter can carry the tree stand assembly as a back pack.

6. The tree stand assembly of claim 1 wherein:
   (h) the seat is pivotally mounted to the stanchion to be movable between a horizontal sitting position and an upright position along a back edge of the stanchion.

7. The tree stand assembly of claim 1 wherein:
   (h) said stanchion is straight and has substantially uniform cross-sectional configuration.

8. The tree stand assembly of claim 7 wherein:
   (i) the platform floor is constituted as a plurality of straight spaced-apart cross beams each welded to the platform frame at each end; and
   (j) the stanchion receiving socket and the stanchion receiving sleeve are each part of a pocket tube welded between two of the cross beams.

9. The tree stand assembly of claim 7 wherein:
(i) first and second end portions of two shoulder straps are fixedly and centrally mounted with respect to a back end portion of the platform, the effective length of a second free end portion of each strap being adjustable with respect to one of opposite, spaced-apart, front edges of the platform, the straps being so positioned that when properly adjusted for length, a hunger can carry the tree stand assembly as a back pack.

10. In a tree stand assembly wherein a horizontal platform is supported on a tree trunk by a pair of vertical, trunk contacting, stabilizing bars which extend integrally downward from a back end portion of the platform and by a holding line extending from fixed relation with respect to a first upper edge of the platform back end portion and around the tree trunk into fixed relation with respect to a second upper edge of said platform back end portion, and wherein the platform is also supported by at least one compression strut extending from a front edge portion of the platform to a lower end of at least one of the stabilizing bars; the improvement wherein:
(a) the platform includes a rigid, horizontal frame partially defining its outer periphery, and a floor connected to and supported by the frame, the frame being of elongate, generally U-shape configuration terminating in first and second spaced apart frame beam ends;
(b) the vertical stabilizing bars are integrally, rigidly and permanently connected to the frame, one at each of the frame beam ends;
(c) the holding line is constituted as a link chain permanently anchored at a first end thereof in fixed relation to the frame adjacent to said first frame beam end, and having a second free portion adapted to be temporarily anchored in fixed relation to the frame adjacent said second frame beam end; and
(d) means is provided to temporarily fixedly anchor the second free portion of the chain to the second beam end under sufficient tension to hold the tree stand in place when under human load without further penetration into the tree trunk, said anchoring means including:

a latch frame extending from the platform frame in adjacent relation to the second frame beam end and its associated vertical stabilizing bar;

a latch hook pivotally mounted to the latch frame on a vertical axis, an outer end of the hook being configured to pass through a link of said chain and being movable between an open position in near relation to the adjacent vertical stabilizing bar and a latched position spaced farther from the bar;

a latch lever rigidly secured to said latch hook so as to define a gap between the latch lever and the latch hook, the latch lever being configured to pivot with said hook; and a latch plate movable with respect to said platform frame between an unlatched and a latched position, said latch plate being movable to its latched position when said latch hook is in its latched position, such that the latch plate is received within said gap and engaged with said latch lever to prevent movement of the hook from its latched position until the latch plate is moved to its unlatched position.

* * * * *

UNITED STATES PATENT AND TRADEMARK OFFICE
CERTIFICATE OF CORRECTION

PATENT NO. :  5,105,910
DATED      :  April 21, 1992
INVENTOR(S):  JAY C. ENGSTROM It is certified that error appears in the above-identified patent and that said Letters Patent is hereby corrected as shown below:

Col. 6, line 14, delete "(n)", insert "(h)"

Col. 6, line 21, delete "hunger", insert "hunter"

Col. 7, line 9, delete "hunger", insert "hunter"

Signed and Sealed this

Thirteenth Day of July, 1993

Attest:

MICHAEL K. KIRK

*Attesting Officer*     *Acting Commissioner of Patents and Trademarks*